(12) United States Patent
Taylor

(10) Patent No.: US 7,179,845 B2
(45) Date of Patent: Feb. 20, 2007

(54) ELASTOMERIC LATEX FOAMS

(75) Inventor: Anthony Taylor, Medina, OH (US)

(73) Assignee: Fomo Products, Inc., Norton, OH (US)

( * ) Notice: Subject to any disclaimer, the term of this patent is extended or adjusted under 35 U.S.C. 154(b) by 0 days.

(21) Appl. No.: 10/340,049

(22) Filed: Jan. 10, 2003

(65) Prior Publication Data

US 2004/0138319 A1 Jul. 15, 2004

(51) Int. Cl.
*C08J 9/14* (2006.01)

(52) U.S. Cl. .......................... 521/131; 521/65; 521/67; 521/88; 521/98; 521/137; 521/139; 521/140; 521/149; 521/170; 521/174

(58) Field of Classification Search ................. 521/65, 521/67, 149, 88, 98, 170, 131, 137, 139, 521/140, 174
See application file for complete search history.

(56) References Cited

U.S. PATENT DOCUMENTS

| 4,381,066 | A | 4/1983 | Page et al. ................. 222/394 |
|---|---|---|---|
| 5,455,113 | A | 10/1995 | Girgis et al. ................ 428/357 |
| 5,814,676 | A | 9/1998 | Jacobs et al. ............... 521/174 |
| 5,863,961 | A | 1/1999 | Jacobs et al. ............... 521/174 |
| 5,916,636 | A | 6/1999 | Vogt .......................... 427/389 |
| 5,968,597 | A | 10/1999 | Vogt et al. .................. 427/377 |
| 6,011,076 | A | 1/2000 | Tabakovic ................... 521/65 |
| 6,121,210 | A | 9/2000 | Taylor ........................ 508/208 |
| 6,194,479 | B1 | 2/2001 | Tabakovic ................... 521/65 |
| 6,284,077 | B1 | 9/2001 | Lucas et al. ................. 156/77 |
| 6,291,536 | B1 | 9/2001 | Taylor ........................ 521/72 |
| 6,333,365 | B1 | 12/2001 | Lucas et al. ................. 521/78 |
| 6,340,715 | B1 | 1/2002 | Sommer ..................... 521/114 |
| 6,395,794 | B2 * | 5/2002 | Lucas et al. ................. 521/65 |
| 6,720,385 | B2 * | 4/2004 | Tabor et al. ................ 524/591 |

* cited by examiner

*Primary Examiner*—John M. Cooney, Jr.
(74) *Attorney, Agent, or Firm*—Buckingham, Doolittle & Burroughs LLP; Louis F. Wagner

(57) ABSTRACT

The invention relates generally to a stable flexible latex foam. The latex foam will contain at least one polymer having a plurality of hard domains and a plurality of soft domains, a micelle forming agent, a hydrocarbon propellant substantially free of dimethyl ether, and an agent which is a solvent for said micelle forming agent and an emulsifier for said hydrocarbon propellant.

50 Claims, No Drawings

ELASTOMERIC LATEX FOAMS

TECHNICAL FIELD

The invention relates generally to a foamable thermoplastic elastomeric emulsions and flexible foams which result therefrom. These flexible foams, upon release from an aerosol canister or the like, present a stable foamed product capable of use as a caulk, sealant, or insulating compound.

BACKGROUND OF THE INVENTION

Caulking, insulation and sealant compositions are used to seal joints and other voids and to reinforce framing, tiles, panels, lathing, wall board and other structural assemblies. Foamed application of such compositions from pressurized containers and the like, is highly desirable due primarily to overall ease of application.

Some of the available foamed compositions are not stable and shrink excessively after foamed application to the desired structure. Quite obviously, these products therefore, fail in providing overall sealing or insulating efficacy. Moreover, other foamed products tend to sag or drip after application, thereby leading to failure.

However, existing latex foam technology produces foams with poor cohesive properties and lack of memory, which is the ability to return to the foam's initial shape upon removal of a compressive load. They are easily torn apart and flatten. Additionally existing technology requires the use of non-ionic or anionic surfactants to stabilize the foam. This invention uses neither type of surfactant.

SUMMARY OF THE INVENTION

The invention is directed to any foamable, thermoplastic elastomer that exists as an emulsion. In this reaction, the polymerization reaction is carried out with the reactants in emulsified form. All emulsions are comprised of a continuous phase and a disperse phase. In an oil-in-water emulsion, water is the continuous phase and the emulsifying agent is a surfactant having a polar group (hydrophilic head) and a non-polar group (hydrophobic tail). Surfactants form micelles at the critical micelle concentration. This critical micelle concentration is significantly greater than the concentration of monomer emulsion droplets. It however is recognized that the size of the micelle is significantly smaller than the size of the droplets.

In this invention, water is the main phase and in a preferred embodiment, the thermoplastic elastomer will have both hard and soft domains. A polyether diol acts as an emulsifier for the hydrocarbon blowing agent as well as a solvent for the fatty alcohol surfactant which assists in the prevention of bubble collapse via solidification around the gas bubble/water interface, similar to a crosslinking reaction. The long chain alcohols and fatty acids reduce the surface tension at the interface of the suspended particles because of the solubility properties of the molecules. Aggregates of these emulsifiers form micelles.

A critical micelle concentration is required in order to form a classical polar head to fatty tail sphere in an aqueous solution. The amounts in this system, typically a 380 g can, is in decimolar amounts per liter. The fatty alcohol tails are solubilized in the hydrocarbon with the hydroxyl groups in the continuous water phase. The ratio of the moles of fatty alcohol to moles of hydrocarbon are important. Generally, it is believed that in polymeric systems, at least 5% of a surfactant is needed to stabilize a particle, although it is recognized and within those of skill in the art that all systems behave differently due to a myriad of factors, e.g., polymeric hard/soft segments, emulsion surfactants, stabilization package, etc. Without being bound to any theory, in a preferred embodiment, this system contains a slight excess of stabilizer in order to prevent bubble coalescence leading to foam collapse.

These and other objects of the present invention will become more readily apparent from a reading of the following detailed description taken in conjunction with the appended claims.

DETAILED DESCRIPTION OF THE INVENTION

This invention lies in the recognition of the fact that there is a critical relationship between the concentration of long chain fatty alcohols and/or fatty acids coupled with the use of a cationic surfactant using thermoplastic emulsion dispersions coupled with a polyether diol emulsifier in a hydrocarbon blend which is essentially free of dimethyl ether.

This invention is illustrated with reference to the following non-limiting examples, provided for the purpose of demonstrating the best mode known at the time of filing this invention.

EXAMPLE #1

Styrene-Butadiene Rubber (SBR) Emulsion & Resultant Foam

The following components were combined into an emulsion.

| Component | Amount (g) | Category | Chemical Structure |
|---|---|---|---|
| XL 9355[a] (Omnova Solutions) | 321.8 | Styrene-butadiene emulsion | $-[CH_2-CH=CH-CH_2CH_2-CH]_n-$ with phenyl group |
| Poly G ® 20-265[b] (Arch) | 5.5 | Polyether diol | $HO-[CH(CH_3)-CH_2O]_{2-5}-H$ |

-continued

| Component | Amount (g) | Category | Chemical Structure |
|---|---|---|---|
| Surfol® 1618 (Huntsman) | 12.6 | Fatty alcohols | ($C_{16}H_{33}OH:C_{18}H_{37}OH$) 50:50 |
| Mackernium SDC-85 (Macintyre Group) | 2.5 | Quaternary stearalkonium chloride | benzyl-N(CH$_3$)$_2$-(CH$_2$)$_{17}$CH$_3$ Cl$^-$ |
| Ethylene glycol | 7.1 | Glycol | $CH_2OHCH_2OH$ |
| Raybo 60 (Raybo Chemical) | 4.5 | Rust Inhibitor | 10% Sodium Nitrite with an alkylamine pH adjuster |

(a) SBR particle size=0.065 microns with Tg=−9° C. (anionically stabilized) (47% by weight solids)
(b) Nominal molecular weight=425 (hydroxyl no. mg KOH/g=265)

334 g of Example #1 were added to 20 g A-60 (30% propane/70% isobutane) and foamed by extrusion through an orifice. It is well within the skill of the art to recognize that flow rates are highly dependent upon several factors, including straw diameter and viscosity. Typical flow rates using a 12 oz. canister and a 0.23 inch I.D. straw would be 30 g/second+/−10 seconds.

EXAMPLE #2

Styrene Butadiene Rubber (SBR) Emulsion & Resultant Foam

The following components were combined into an emulsion.

| Component | Amount (g) | Category | Chemical Structure |
|---|---|---|---|
| XL 9350$^{(a)}$ (Omnova Solutions) | 321.8 | Styrene-butadiene emulsion | −[CH$_2$−CH=CH−CH$_2$CH$_2$−CH(Ph)]$_n$− |
| Poly G® 20-265 (Arch) | 5.5 | Polyether diol | HO−[CH(CH$_3$)−CH$_2$O]$_{2-5}$−H |
| Surfol® 1618 (Huntsman) | 12.6 | Fatty alcohols | ($C_{16}H_{33}OH:C_{18}H_{37}OH$) 50:50 |
| Mackernium SDC-85 (Macintyre Group) | 2.5 | Quaternary stearalkonium chloride | benzyl-N(CH$_3$)$_2$-(CH$_2$)$_{17}$CH$_3$ Cl$^-$ |
| Ethylene glycol | 7.1 | Glycol | $CH_2OHCH_2OH$ |
| Raybo 60 (Raybo Chemical) | 4.5 | Rust Inhibitor | 10% Sodium Nitrite with an alkylamine pH adjuster |

(a) SBR particle size=0.008 microns and Tg=−35° C. (anionically stabilized)

334 g of Example #2 were added to 20 g A-60 (30% propane/70% isobutane) and foamed by extrusion through an orifice.

In examples #1 and #2, the Styrene-Butadiene Rubber (SBR) contains hard and soft domains, hard polystyrene domains and soft butadiene domains. Within this bulk material, there are separations and aggregations of the domains. This provides the structure to the foam and prevents mechanical collapse. In these two examples, the hard and soft segments are reacted into one dispersion or emulsion. The diol (Poly-G® 265) acts as a heat sink/solvent for the Surfol® 1618 and also as an emulsifier for the hydrocarbon blowing agent (A-60). Due to the incompatibility between the two segments of the polymer chain, the hard segments separate and aggregate into domains that act as reinforcing filler to the soft segments. This hard and soft segmentation as well as the pseudo crosslinks formed by the anionic sulfate or carboxylate ions, help to structurally stabilize the foam. However, this is not enough to prevent cell structural damage and eventual foam collapse. This collapse is prevented by the solidification of the fatty alcohols (Surfol® 1618) around the gas bubble/water interface. Once the foam is dry, the hard segments prevent the foam from mechanically collapsing. Long chain alcohols and fatty acids are believed to reduce the surface tension of the interface of the suspended particles because of the solubility properties of the molecules. The cationic surfactant, the quaternary ammonium salt is optionally used for water repellency, while the ethylene glycol is optionally added for increased freeze resistance and the Raybo is optionally added for rust inhibition.

EXAMPLE #3

Polyurethane Emulsion & Resultant Foam

The following components were combined into an emulsion.

having a particle size of 2.5 micrometers, surface tension of 42 dynes/cm, 7–9 pH @ 25° C., a Brookfield LVF viscosity of 300 cps @ 25° C., a specific gravity of 1.07 @ 25° C. and a Tg of −36° C.

(b) ethylene/vinyl acetate copolymer, Tg=0° C.

334 g of Example #3 were added to 20 g A-60 (30% propane/70% isobutane) and foamed by extrusion through an orifice.

The incorporation of the ethylene/vinyl acetate copolymer did not improve the final characteristics of the foamed polymer in that the bead collapsed after two days. By contrast, in the next example, no bead collapse was evident as well as surviving at least three freeze thaw cycles.

EXAMPLE #4

Polyurethane Emulsion & Resultant Foam

The following components were combined into an emulsion, with the amount of Witcobond W-293 essentially doubled and the Airflex 720-BP eliminated from the system.

| Component | Amount (g) | Category | Chemical Structure |
|---|---|---|---|
| Witcobond W-293[a] | 160.9 | Polyurethane dispersion CAS# 71394-31-5 | isophthalic acid polymer with adipic acid, hexanediol, dimethylolpropanoic acid and 1,1'-methylbis[isocyanatocyclohexane] |
| Airflex 720-BP[b] | 160.9 | Ethylene vinyl acetate copolymer | |
| Poly G® 20-265 (Arch) | 5.5 | Polyether diol | $HO\text{-}[CH(CH_3)\text{-}CH_2O]_{2\text{-}5}\text{-}H$ |
| Surfol® 1618 (Huntsman) | 12.6 | Fatty alcohols | $(C_{16}H_{33}OH{:}C_{18}H_{37}OH)$ 50:50 |
| Mackernium SDC-85 (Macintyre Group) | 2.5 | Quaternary stearalkonium chloride | $\text{Ph-CH}_2\text{-}\overset{\oplus}{N}(CH_3)_2\text{-}(CH_2)_{17}CH_3 \; Cl^{\ominus}$ |
| Ethylene glycol | 7.1 | Glycol | $CH_2OHCH_2OH$ |
| Raybo 60 (Raybo Chemical) | 4.5 | Rust Inhibitor | 10% Sodium Nitrite with an alkylamine pH adjuster |

(a) an anionic, low viscosity, high solids, waterborne polyurethane dispersion (67% total solids by weight)

| Component | Amount (g) | Category | Chemical Structure |
|---|---|---|---|
| Witcobond W-293[a] | 321.8 | Polyurethane dispersion | isophthalic acid polymer with adipic acid, hexanediol, dimethylolpropanoic acid and 1,1'-methylbis[isocyanatocyclohexane] |
| Poly G® 20-265 (Arch) | 5.5 | Polyether diol | $HO\text{-}[CH(CH_3)\text{-}CH_2O]_{2\text{-}5}\text{-}H$ |
| Surfol® 1618 (Huntsman) | 12.6 | Fatty alcohols | $(C_{16}H_{33}OH{:}C_{18}H_{37}OH)$ 50:50 |

-continued

| Component | Amount (g) | Category | Chemical Structure |
|---|---|---|---|
| Mackernium SDC-85 (Macintyre Group) | 2.5 | Quaternary stearalkonium chloride | 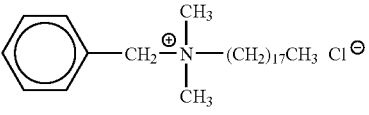 |
| Ethylene glycol | 7.1 | Glycol | $CH_2OHCH_2OH$ |
| Raybo 60 (Raybo Chemical) | 4.5 | Rust Inhibitor | 10% Sodium Nitrite with an alkylamine pH adjuster |

(a) an anionic, low viscosity, high solids, waterborne polyurethane dispersion (67% total solids by weight) having a particle size of 2.5 micrometers, surface tension of 42 dynes/cm, 7–9 pH @ 25° C., a Brookfield LVF viscosity of 300 cps @ 25° C., a specific gravity of 1.07 @ 25° C. and a Tg of −36° C.

334 g of Example #4 were added to 20 g A-60 (30% propane/70% isobutane) and foamed by extrusion through an orifice. This is an example of a single emulsion having hard and soft segments with a high solids content. The generated bead did not collapse for more than two days and survived three freeze thaw cycles.

EXAMPLE #5

Polyurethane Emulsion & Resultant Foam

The following components were combined into an emulsion.

| Component | Amount (%) | Category | Chemical Structure |
|---|---|---|---|
| Witcobond W-293[a] | 88.02 | Polyurethane dispersion | isophthalic acid polymer with adipic acid, hexanediol, dimethylolpropanoic acid and 1,1'-methylbis[isocyanatocyclohexane] |
| Poly G® 20-265 (Arch) | 1.54 | Polyether diol | $HO{-}{\left[CH(CH_3){-}CH_2O\right]}_{2-5}{-}H$ |
| Alfol® 16 (Sasol) | 0.86 | Fatty alcohol | $C_{16}H_{33}OH$ |
| Alfol® 18 (Sasol) | 2.55 | Fatty alcohol | $C_{18}H_{37}OH$ |
| Mackernium SDC-85 (Macintyre Group) | 0.18 | Quaternary stearalkonium chloride | 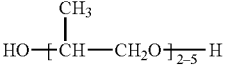 |
| Ethylene glycol | 1.19 | Glycol | $CH_2OHCH_2OH$ |
| A-60 | 5.66 | Propane/isobutane | (30:70) |

(a) an anionic, low viscosity, high solids, waterborne polyurethane dispersion (67% total solids by weight) having a particle size of 2.5 micrometers, surface tension of 42 dynes/cm, 7–9 pH @ 25° C., a Brookfield LVF viscosity of 300 cps @ 25° C., a specific gravity of 1.07 @ 25° C. and a Tg of −36° C.

The Witcobond W-293 polyurethane dispersion was formed by reacting an excess of aliphatic isocyanates with a polyol or a mixture of polyols to form a prepolymer containing a soft segment. The diisocyanates have hard segments, short chain diamines and short ion containing chains. Due to the incompatibility between the two segments of the polymer chain, the hard segments separate and aggregate into domains that act as reinforcing filler 11 to the soft segments. This hard and soft segmentation as well as the pseudo crosslinks formed by the anionic sulfate or carboxylate ions, help to structurally stabilize the foam. However, this is not enough to prevent cell structural damage and eventual foam collapse. This collapse is prevented by the solidification of the fatty alcohols around the gas bubble/water interface. Once the foam is dry, the hard segments prevent the foam from mechanically collapsing.

As illustrated in all of the examples, the diol (Poly-G® 20-265) acts as an emulsifier and the fatty alcohol stabilizers can be added into a system that contains two very different emulsions, e.g., Airflex 720-BP (ethylene/vinyl acetate copolymer, 0° C. Tg, soft coalescing segments that forms the discontinuous phase of the dried foam) and Lucidene 370 (acrylic acid stabilized polystyrene, 100° C. Tg, hard non-coalescing segments that form the continuous phase of the dried foam). These discrepant glass transition temperatures, provide for the mechanical stabilization of the foam.

Therefore, what has been shown is three different emulsion systems. Two of the systems are based on one emulsion that contains both hard and soft segments, while the third is based on blending one soft, low Tg emulsion with a hard Tg emulsion. The Witcobond W-293 (Example #4) is a single emulsion with a Tg @ −36° C. It has excellent elongation and cohesion and a high solids content of 67%, which is preferred to facilitate drying.

The second system (Example #3) has little elongation or cohesion. The third system (Examples #1–2) are foamable, however, present some drawbacks. First, the foams tend to flatten upon drying. This may be due to the low percentage solids in these emulsions (46–49%). Also, they do not have near the elongation and cohesion of the Witcobond based foams. This may be primarily due to differences in the particle sizes. The Witcobond particle size is 2.5 microns whereas the particle sizes of the SBR's are 0.08 (XL 9350) and 0.065 (XL 9355) respectively. Volumetrically, this means that the Witcobond W-293 particle is about 30,500 to about 57,000 times larger than the SBR particles. This correlates to there being relatively small amounts of soft segments to coalesce, entangle and cause the elastomeric cohesive properties inherent in the Witcobond formulation. The Tg's for the two SBRs are −35° C. and −9° C. Both of these emulsions are anionically stabilized.

EXAMPLE #6

Polyurethane Emulsion & Resultant Foam

The importance of the critical micelle concentration is illustrated in the following example. This parameter is defined as the amount of a substance needed to form a classical polar head to fatty tail sphere in an aqueous solution. The amounts in this system, a 380 g can, is in decimolar amounts per liter. The fatty alcohol tails are solubilized in the hydrocarbon with the hydroxyl groups in the continuous water phase. The ratio of the moles of fatty alcohol to the moles of hydrocarbon are of utmost importance. Generally, it is believed that in polymeric systems at least 5% of a surfactant is needed to stabilize a particle. This system requires extra stabilizer in order to prevent bubble coalescence leading to foam collapse.

(a) 3-iodo-2-propynyl butyl carbamate

A compounded can contains 358.5 g (94.34%) of the formulation plus 21.5 g (5.66%) of A-60. While Alfol 16 & 18 are not 100% cetyl alcohol and stearyl alcohol respectively in that they contain other lower and higher carbon chain fatty alcohol fractionations, if it is assumed that they are essentially pure, and used in a ratio of $C_{16}OH:C_{18}OH$ is 25%:75%, then the stabilizing package has a gram molecular weight of 263.5 g/mole.

The above foams were then assessed for foam bead height. The compositions shown above provided insight as to the determination of the critical amount of fatty alcohol necessary to prevent and/or inhibit bubble coalescence and collapse. The foam bead height of extruded 6 inches (15.24 cm)×1 inch (2.54 cm) foams were measured via calipers of the various formulations over time.

| Results | A Height (mm) | B Height (mm) | C Height (mm) | D Height (mm) |
|---|---|---|---|---|
| t = 0 minutes | 19.12 | 20.47 | 18.53 | 18.52 |
| t = 20 minutes | 11.52 | 12.01 | 16.93 | 18.96 |
| t = 40 minutes | 13.17 | 10.09 | 15.66 | 20.01 |
| t = 60 minutes | 12.49 | 10.65 | 16.49 | 22.22 |
| t = 90 minutes | 10.75 | 10.39 | 17.59 | 20.50 |
| t = 6 days (bead dry) | 9.63 | 10.00 | 10.86 | 13.75 |
| Polyphase AF1 | 0.8 g | 0.8 g | 0.8 g | 0.8 g |
| % collapse or expansion (C = collapse, E = expansion) | | | | |
| t = 0 minutes | — | — | — | — |
| t = 20 minutes | C 40% | C 41% | C 9% | E 2% |
| t = 40 minutes | C 31% | C 51% | C 15% | E 8% |
| t = 60 minutes | C 35% | C 48% | C 11% | E 20% |
| t = 90 minutes | C 44% | C 49% | C 5% | E 10% |
| t = 6 days | C 50% | C 51% | C 41% | C 26% |

Additionally, a 12 ounce cup was filled to the rim with each of the formulations. The foam level was then observed.

| Material | A | B | C | D |
|---|---|---|---|---|
| Witcobond W-293 | 356.6 g (95.35%) | 355.1 g (94.95%) | 351.4 g (93.95%) | 348.3 g (93.13%) |
| Ethylene glycol | 4.7 g | 4.7 g | 4.7 g | 4.7 g |
| Poly-G 20-265 | 6.0 g | 6.0 g | 6.0 g | 6.0 g |
| Alfol 16 | 1.3 g | 1.7 g | 2.6 g | 3.4 g |
| Alfol 18 | 3.9 g | 5.0 g | 7.8 g | 10.1 g |
| Mackernium SDC-85 | 0.7 g | 0.7 g | 0.7 g | 0.7 g |
| Polyphase AF1[a] | 0.8 g | 0.8 g | 0.8 g | 0.8 g |
| Total | 374 g | 374 g | 374 g | 374 g |
| Total g fatty alcohol | 5.2 g | 6.7 g | 10.4 g | 13.5 g |
| g fatty alcohol actually used | 5.37 | 6.80 | 10.46 | 14.76 |
| Moles fatty alcohol in aerosol can | 0.01923 | 0.02435 | 0.03745 | 0.05284 |
| g A-60 added | 21.4 | 21.6 | 21.6 | 21.6 |
| Moles A-60 in aerosol can | 0.39784 | 0.40155 | 0.40155 | 0.40155 |
| CMC (moles FA/moles A-60) × 100% | 4.83% | 6.06% | 9.33% | 13.16% |

| Results | A Height (mm) | B Height (mm) | C Height (mm) | D Height (mm) |
| --- | --- | --- | --- | --- |
| t = 7 days | Flush | Flush | E 7% | E 9% |

Therefore, it is concluded that the fatty alcohol concentration must be at least 2% of the formulation, and preferably 12.74 g per 380 g can. Of course, the more fatty alcohol in the formulation, the more viscous the end product. The upper concentration of fatty alcohol is dependent on a number of factors, one of the most important being the percentage solids, emulsion stabilizer/surfactant combination, particle size, and initial viscosity. The critical micelle concentration can reach high concentration levels of alcohols to the point where the blend is still capable of being processed or filled under viscosity constraints.

Therefore, it is believed that when the thermoplastic elastomeric polymeric emulsion is of a sufficient particle size, with a sufficient percentage of hard domains and solids, and the emulsions' stabilization package is compatible with the foam stabilization package, then the emulsion could be foamed and the resulting dried foam bead would not flatten.

Without being held to any one theory of operation or mechanism, it is believed that the fatty alcohols that undergo a phase change from liquid to solid prevent bubble coalescence at the A-60 water interface. It has been observed that as the viscosity of the system is increased, in comparison to the fatty alcohols, that the foam beads flatten upon 11 drying. The ratio of stearyl alcohol to cetyl alcohol is also important. The linear saturated behenyl alcohol ($C_{22}H_{47}OH$) does not produce a wet or dry stable foam. It is believed that this is primarily due to the solubility parameters between the fatty alcohols/acids and the diol (Poly-G® 20-265) that emulsifies the A-60. It is also believed that certain fatty amides and fatty diesters may also stabilize the system.

The delta Tg is not particularly important, but what is important is that the high Tg emulsion or segments must have a Tg above that of room temperature and must not coalesce.

What has been described is a method and resulting product by which hard blocks are predominantly in the center while peripheral surfaces have soft blocks, which upon drying, promote chain entanglement, which is the predominate elasticity provide, while the hard blocks in the middle provide the structural integrity.

In one additional experiment, HEST EGDS (ethylene glycol distearate) and PARAMUL SAS (stearamide diisobutyl amine stearate) were substituted for Alfol 18 (stearyl alcohol). These molecules are not polar, but can arrange themselves in a "U" shape at an interface. The hydroxyl and amine moieties will be at the water phase while the two fatty alkyl chains will be partially solubilized in the hydrocarbon liquid phase. In one experiment, where both ALFOL 18 and ALFOL 16 were replaced by HEST EGDS, the resultant dry bead partially collapsed. This underlines the importance of the solubility parameters of the fatty alcohols in the Poly-G® 20-265 heat sink. ALFOL 16 by itself at 0.86%, is very much below the critical micelle concentration (CMC) needed to stabilize the foam.

The quaternary ammonium salt is incorporated into the formulation for water repellency. It is a substantive agent that migrates through the foam to the foam surface. Most surfaces carry a light electronegative charge. Cationic surfactant agents are recommended for water repellency in water-based technology for this reason. However, in this invention, both nonionic and cationic surfactants are preferred. Nonionics work better than anionics because they carry no charge and therefore do not contribute to electrostatic repulsion at the hydrocarbon/water interface. Cationics work better than anionics because they have a large charge density (take up less space) as compared to the small charge density (takes up more space) of an anionic surfactant. Steric factors, packing efficiency and the ability to undergo a phase change (liquid to solid) is what enables the dispersed nonionic surfactants to stabilize the foam. The ability to form a micelle is given by the relationship: $R < \frac{1}{3}$ with $R = V/aL$ (Volume/area×length). Foam stabilization is also dependent on the concentration of foam stabilizer. In other words the foam stabilizer must be above the critical micelle concentration. This is why Surfol 1618 is at 3.4% (in comparison to the Mackernium SDC-85 that is at 0.66%). If you take the Surfol 1618 out of the formulation while keeping the Mackernium concentration at 0.66%, you will not produce a stable foam. If you eliminate the Surfol 1618 from the formulation, and increase the Mackernium SDC-85 concentration to 3.4%, you will coagulate the emulsion.

Also, further investigation has shown that Mackernium SDC-85 at concentrations of 0.66% cause freeze/thaw instability. When the Mackernium SDC-85 concentration is reduced to 0.19%, it is still enough to cause significant water repellency. At a tap water flow rate of 60.5 g/min., the formulation without Mackernium SDC-85 will absorb 100% of the water in comparison to 7.8% of water if containing 0.19% Mackernium SDC-85. The test is run by filling the bottom two inches of a 12-oz cup with paper towel and then applying one inch of foam over the paper towel. The test construct is then left to dry for 24-hours. The amount of water absorption is the weight gain divided by the initial weight. In comparison, a Prior Art DAPtex product absorbed 36.3% of the water. In fact, a direct comparison of the Prior Art DAPtex product with Example #5 of the invention, yielded the following properties, clearly indicating the superior elongation and recovery of the product of this invention.

| Properties Evaluated | DAPtex | Example #5 |
| --- | --- | --- |
| Force to break @ 5 in./min strain rate | 262 grams | 479 grams |
| % Elongation at break | 10% | 300% |
| Force to Tear @ 5 in./min strain rate | 63.6 grams | 256.7 grams |
| Elongation - Retention - Recovery | | |
| Initial Length | 2 in. | 2 in. |
| Strain | 2.2 in. | 4 in. |
| % Strain | 10% | 100% |
| Final Length | 2.08 in. | 2.2 in. |
| % Gain Recovery | 40% | 90% |
| % Gain Loss | 60% | 10% |

The amount of ethylene glycol can be decreased from 1.89% to 1.41% or 1.18% (the lower the amount of ethylene glycol in the formulation, the faster the desirable dry time). Ethylene glycol provides freeze/thaw stability, but inhibits drying due to hydrogen bonding with the free water in the emulsion.

The use of Poly-G® 20-265 is not unique in standard polyurethane foam technology, one component foams, that rely on condensation polymerization involving the hydroxyl group of the polyol and the functional group of the isocyanate reactant in order to form a urethane bond. However, it is unique to latex foam technology. In the previous work conducted, there is the need for isopropyl alcohol in order to disperse the waxy solid stabilizer/emulsifier. In the current formulation, isopropyl alcohol will cause the system to coagulate. Therefore, the Poly-G® 20-265 serves a dual function: (1) as the heat sink/solvent to disperse the Surfol 1618 and the Mackernium SDC-85; and (2) as the emulsifier for the hydrocarbon blowing agent. Previous work mentions the use of HLB surfactants that cover a HLB range of 3 on up or anionic surfactants. In none of the Prior Art patents is the use of HLB below 3 or polyols taught. The Poly-G® 20-265 is not a surfactant, yet, it is serving as an emulsifier. This is a significant difference over the Prior Art. Additionally, the formulations use A-60, a hydrocarbon blend, instead of the hydrocarbon/dimethyl ether mixture used in several Prior Art patents. The presence of dimethyl ether in the current work will cause coagulation.

What is innovative is the elasticity of the product. This is a function of the thermoplastic elastomers used, particularly the polyurethane dispersions (PUD). The particle size is 2.5 microns with a Tg (glass transition temperature) of $-36°$ C. In the prior art, the vinylacetate/ethylene copolymer has a particle size of 1.2 microns and a Tg of $0°$ C. The styrenic emulsion has a particle size of 0.08 microns and a Tg of $100°$ C. In this improved invention, the PUD particles are composed of hard, aliphatic isocyanate inner segments surrounded by soft, outer polyol segments. These outer polyol segments can coalesce upon drying (unravel). Upon unraveling, they undergo chain entanglement. It is this chain entanglement that gives the foam its markedly superior adhesive, cohesive and elastic properties that are almost nonexistent in the current latex products. Meanwhile, the hard, inner, aliphatic isocyanate segments give the foam mechanical/physical structuring. This is at least one component that creates superior resiliency.

This invention has been described in detail with reference to specific embodiments thereof, including the respective best modes for carrying out each embodiment. It shall be understood that these illustrations are by way of example and not by way of limitation. Accordingly, the scope and content of the present invention are to be defined only by the terms of the appended claims.

What is claimed is:

1. A latex foam composition derived from a water-based emulsion which comprises:
   at least one polymer having a plurality of hard domains and a plurality of soft domains;
   a hydrocarbon propellant to form gas bubbles within said at least one polymer, said propellant having no dimethyl ether;
   a fatty alcohol micelle forming agent
      said micelle forming agent present in an amount of at least 2% of said composition,
      said micelle forming agent solidifying around said gas bubbles at said hydrocarbon propellant and water interface thereby assisting in the prevention of bubble collapse due to coalescence of said bubbles at said interface; and
   a polyether diol agent which is a solvent for said micelle forming agent and an emulsifier for said hydrocarbon propellant.

2. The foam of claim 1 wherein
   said micelle forming agent comprises 16 carbon atoms and 18 carbon atoms.

3. The foam of claim 2 wherein
   a critical micelle ratio of moles of micelle forming agent to moles of hydrocarbon propellant is at least approximately 5%.

4. The foam of claim 3 wherein
   said critical micelle ratio is in excess of at least approximately 9%.

5. The foam of claim 4 wherein
   said critical micelle ratio is in excess of at least approximately 13%.

6. The foam of claim 3 wherein
   said micelle forming agent comprises at least two different micelle forming agents.

7. The foam of claim 6 wherein
   said polymer is a thermoplastic elastomer;
   said polyether diol comprises a 1,2-propanediol homopolymer;
   said hydrocarbon propellant is a $C_2$–$C_4$ alkane and mixtures thereof; and
   said micelle forming agent comprises $C_{16}$ and $C_{18}$ monohydroxyl fatty alcohols.

8. The foam of claim 7 wherein
   said thermoplastic elastomer is selected from the group consisting of polyurethanes and styrene-butadiene rubbers.

9. The foam of claim 8 wherein
   said thermoplastic elastomer is a polyurethane.

10. The foam of claim 3 which further comprises
    a surfactant selected from the group consisting of a cationic surfactant and a non-ionic surfactant.

11. The foam of claim 10 which further comprises
    an alkylene glycol.

12. The foam of claim 3 wherein
    said polymer comprises particles having a particle size of between about 0.05 microns to about 3.5 microns.

13. The foam of claim 5 wherein
    said polymer comprises particles having a particle size of between about 0.05 microns to about 3.5 microns.

14. A latex foam composition derived from a water-based emulsion which comprises:
    at least two polymers, at least one of said polymers being an emulsion having a first Tg, and at least one other of said polymers being an emulsion having a second Tg, at least one of said Tg's being above about $22°$ C.;
    a hydrocarbon propellant to form gas bubbles within said at least two polymers, said propellant having no dimethyl ether;
    a fatty alcohol micelle forming agent,
       said micelle forming agent present in an amount of at least 2% of said composition;
       said micelle forming agent solidifying around said gas bubbles at said hydrocarbon propellant and water interface thereby assisting in the prevention of bubble collapse due to coalescence of said bubbles at said interface; and
    a polyether diol agent which is a solvent for said micelle forming agent and an emulsifier for said hydrocarbon propellant.

15. The foam of claim 14 wherein
    said micelle forming agent comprises 16 carbon atoms and 18 carbon atoms.

16. The foam of claim 15 wherein
    a critical micelle ratio of moles of micelle forming agent to moles of hydrocarbon propellant is at least approximately 5%.

17. The foam of claim 16 wherein
    said critical micelle ratio is in excess of at least approximately 9%.

18. The foam of claim 17 wherein
    said critical micelle ratio is in excess of at least approximately 13%.

19. The foam of claim 16 wherein
said micelle forming agent comprises at least two different micelle forming agents.
20. The foam of claim 19 wherein
said polymers forming hard domains comprising a multiplicity of areas with each arrangement of hard domains forming a center and said polymers forming soft domains are about a periphery of said hard domains thereby promoting chain entanglement;
said polyether diol comprises a 1,2-propanediol homopolymer;
said hydrocarbon propellant is a $C_2$–$C_4$ alkane and mixtures thereof; and
said micelle forming agent comprises $C_{16}$ and $C_{18}$ monohydroxyl fatty alcohols.
21. The foam of claim 20 wherein
said polymers are styrene-butadiene rubbers.
22. The foam of claim 20 wherein
said polymers are polyurethanes.
23. The foam of claim 16 which further comprises
a surfactant selected from the group consisting of a cationic surfactant and nonionic surfactant.
24. The foam of claim 23 which further comprises
an alkylene glycol.
25. The foam of claim 16 wherein
said polymer comprises particles having a particle size of between about 0.05 microns to about 3.5 microns.
26. The foam of claim 18 wherein
said polymer comprises particles having a particle size of between about 0.05 microns to about 3.5 microns.
27. A latex foam composition derived from a water-based emulsion which comprises:
a thermoplastic elastomer having a plurality of hard domains and a plurality of soft domains;
a hydrocarbon propellant to form gas bubbles within said at least one thermoplastic elastomer, said propellant having no dimethyl ether;
a fatty alcohol micelle forming agent,
said micelle forming agent present in an amount of at least 2% of said composition,
said micelle forming agent solidifying around said gas bubbles at said hydrocarbon propellant and water interface thereby assisting in the prevention of bubble collapse due to coalescence of said bubbles at said interface; and
a polyether diol agent which is a solvent for said micelle forming agent and an emulsifier for said hydrocarbon propellant.
28. The foam of claim 27 wherein
said micelle forming agent comprises 16 carbon atoms and 18 carbon atoms.
29. The foam of claim 28 wherein
a critical micelle ratio of moles of micelle forming agent to moles of hydrocarbon propellant is at least approximately 5%.
30. The foam of claim 29 wherein
said critical micelle ratio is in excess of at least approximately 9%.
31. The foam of claim 30 wherein
said critical micelle ratio is in excess of at least approximately 13%.
32. The foam of claim 29 wherein
said micelle forming agent comprises at least two different micelle forming agents.
33. The foam of claim 32 wherein
said thermoplastic elastomer is a polyurethane;
said polyether diol comprises a 1,2-propanediol homopolymer;
said hydrocarbon propellant is a $C_2$–$C_4$ alkane and mixtures thereof; and
said micelle forming agent comprises $C_{16}$ and $C_{18}$ monohydroxyl fatty alcohols.
34. The foam of claim 33 wherein
said polyurethane is an isophthalic acid polymer with adipic acid, hexanediol, dimethylolpropanoic acid and 1,1'-methylbis(isocyanatocyclohexane).
35. The foam of claim 29 which further comprises
a surfactant selected from the group consisting of a cationic surfactant and nonionic surfactant.
36. The foam of claim 35 which further comprises
an alkylene glycol.
37. The foam of claim 29 wherein
said thermoplastic elastomer comprises particles having a particle size of between about 0.05 microns to about 3.5 microns.
38. The foam of claim 31 wherein
said thermoplastic elastomer comprises particles having a particle size of between about 0.05 microns to about 3.5 microns.
39. A latex foam composition derived from a water-based emulsion which comprises:
at least one polymer having a plurality of hard domains and a plurality of soft domains;
a hydrocarbon propellant to form gas bubbles within said at least one polymer, said propellant having no dimethyl ether;
a fatty alcohol blend micelle forming agent,
said fatty alcohol blend present in an amount of at least 2% of said composition,
said fatty alcohol blend solidifying around said gas bubbles at said hydrocarbon propellant and water interface thereby assisting in the prevent of bubble collapse due to coalescence of said bubbles at said interface; and
a polyether diol agent which is a solvent for said fatty alcohol blend and an emulsifier for said hydrocarbon propellant.
40. The foam of claim 39 wherein
said micelle forming agent is a blend which comprises $C_{16}$ and $C_{18}$ monohydroxyl fatty alcohols.
41. The foam of claim 40 wherein
a critical micelle ratio of moles of micelle forming agent to moles of hydrocarbon propellant is at least approximately 5%.
42. The foam of claim 41 wherein
said critical micelle ratio is in excess of at least approximately 9%.
43. The foam of claim 42 wherein
said critical micelle ratio is in excess of at least approximately 13%.
44. The foam of claim 43 wherein
said micelle forming agent is at least two different micelle forming agents.
45. The foam of claim 44 wherein
said at least one polymer comprises a thermoplastic elastomer;

said polyether diol agent has a propyl ether repeating unit of about 2 to 5;

said hydrocarbon propellant is a $C_2$–$C_4$ alkane and mixtures thereof; and said micelle forming agent comprises cetyl alcohol and stearyl alcohols.

46. The foam of claim 45 wherein said thermoplastic elastomer is selected from the group consisting of polyurethanes and styrene-butadiene rubbers.

47. The foam of claim 46 wherein said thermoplastic elastomer is a polyurethane.

48. The foam of claim 47 which further comprises a surfactant selected from the group consisting of a cationic surfactant and nonionic surfactant.

49. The foam of claim 48 which further comprises an alkylene glycol.

50. The foam of claim 49 wherein said polyurethane comprises particles having a particle size of between about 0.05 microns to about 3.5 microns.

* * * * *

UNITED STATES PATENT AND TRADEMARK OFFICE
CERTIFICATE OF CORRECTION

| | |
|---|---|
| PATENT NO. | : 7,179,845 B2 |
| APPLICATION NO. | : 10/340049 |
| DATED | : February 20, 2007 |
| INVENTOR(S) | : Anthony J. Taylor |

It is certified that error appears in the above-identified patent and that said Letters Patent is hereby corrected as shown below:

Column 11, line 32, by deleting the number "11."

Signed and Sealed this

Tenth Day of July, 2007

JON W. DUDAS
*Director of the United States Patent and Trademark Office*